(12) United States Patent
Schlenga et al.

(10) Patent No.: US 8,316,651 B2
(45) Date of Patent: Nov. 27, 2012

(54) SUPERCONDUCTING MAGNET SYSTEM WITH RADIATION SHIELD DISPOSED BETWEEN THE CRYOGENIC FLUID TANK AND A REFRIGERATOR

(75) Inventors: Klaus Schlenga, Linkenheim-Hochstetten (DE); Claus Hanebeck, Rheinstetten (DE)

(73) Assignee: Bruker Biospin GmbH, Rheinstetten (DE)

( * ) Notice: Subject to any disclaimer, the term of this patent is extended or adjusted under 35 U.S.C. 154(b) by 1114 days.

(21) Appl. No.: 11/488,776

(22) Filed: Jul. 19, 2006

(65) Prior Publication Data

US 2007/0022761 A1 Feb. 1, 2007

(30) Foreign Application Priority Data

Jul. 30, 2005 (DE) .......................... 10 2005 035 894

(51) Int. Cl.
*F25B 19/00* (2006.01)
(52) U.S. Cl. .............................................. 62/51.1; 62/6
(58) Field of Classification Search .................. 62/51.1, 62/6
See application file for complete search history.

(56) References Cited

U.S. PATENT DOCUMENTS

| | | | |
|---|---|---|---|
| 2,897,820 A | 8/1959 | Tauber | |
| 3,182,682 A | 5/1965 | Shlrodkar | |
| 3,372,695 A | 3/1968 | Beliveau et al. | |
| 3,763,860 A | 10/1973 | Clarke | |
| 3,924,633 A | 12/1975 | Cook et al. | |
| 4,172,458 A | 10/1979 | Pereyra | |
| 4,235,238 A | 11/1980 | Ogiu et al. | |
| 4,392,495 A | 7/1983 | Bayers | |
| 4,493,323 A | 1/1985 | Albright et al. | |
| 4,509,516 A | 4/1985 | Richmond | |
| 4,857,041 A | 8/1989 | Annis et al. | |
| 5,112,344 A | 5/1992 | Petros | |
| 5,281,237 A | 1/1994 | Gimpelson | |
| 5,368,595 A | 11/1994 | Lewis | |
| 5,403,328 A | 4/1995 | Shallman | |
| 5,439,467 A | 8/1995 | Benderev et al. | |
| 5,458,609 A | 10/1995 | Gordon et al. | |
| 5,474,543 A | 12/1995 | McKay | |
| 5,586,437 A | 12/1996 | Blecher | |
| 6,389,821 B2 | 5/2002 | Strobel | |
| 6,804,968 B2 | 10/2004 | Strobel | |
| 7,395,671 B2 * | 7/2008 | Miki ............................... | 62/51.1 |
| 2008/0092557 A1 * | 4/2008 | Mraz et al. ..................... | 62/51.1 |

FOREIGN PATENT DOCUMENTS

| | | |
|---|---|---|
| JP | 62 277 707 | 12/1987 |
| JP | 631 17 409 | 5/1988 |
| WO | WO 02/39890 | 5/2002 |
| WO | WO 03/053252 | 7/2003 |

* cited by examiner

*Primary Examiner* — John Pettitt
(74) *Attorney, Agent, or Firm* — Paul Vincent

(57) ABSTRACT

A superconducting magnet system with a superconducting magnet coil system disposed in a cryogenic fluid tank (2) of a cryostat (1), and a refrigerator (6) for cooling the cryogenic fluid that cools the magnet, is characterized in that a radiation shield (5; 21; 31; 41; 51) is provided which separates a refrigerator space (4) from the cryogenic fluid tank (2), wherein the entire cooling region (9) of the refrigerator (6) is disposed in the refrigerator space (4), and wherein the radiation shield (5; 21; 31; 41; 51) has openings (11; 22; 44, 45; 53) for gas or fluid exchange between the refrigerator space (4) and the cryogenic fluid tank (2). Should the refrigerator fail, the thermal input into the cryostat is reduced, and the safety of the maintenance staff is improved in case of a quench.

8 Claims, 6 Drawing Sheets

SUPERCONDUCTING MAGNET SYSTEM WITH RADIATION SHIELD DISPOSED BETWEEN THE CRYOGENIC FLUID TANK AND A REFRIGERATOR

This application claims Paris Convention priority of DE 10 2005 035 894.2 filed Jul. 30, 2005 the complete disclosure of which is hereby incorporated by reference.

BACKGROUND OF THE INVENTION

The invention concerns a superconducting magnet system with a superconducting magnet coil system which is disposed in a cryogenic fluid tank of a cryostat, and a refrigerator provided for cooling the cryogenic fluid which cools the magnet.

A system of this type is disclosed e.g. in DE 100 33 410 C1.

Superconducting magnet systems generate high magnetic field strengths of the kind required e.g. in nuclear magnetic resonance (NMR) for both spectroscopic and imaging methods. The magnet coil configuration must be cooled in a cryostat in order to obtain a superconducting state for the magnet system. The cryostat comprises at least one cryogenic fluid tank in which a cryogenic fluid, e.g. liquid helium, is stored. The magnet coil system is also disposed in the cryogenic fluid tank. The cryogenic fluid thereby cools the magnet coil system. In its liquid state, the cryogenic fluid has a maximum temperature which corresponds to its boiling point.

Due to unavoidable heat input into the cryostat, the cryogenic fluid must normally be regularly refilled. This process causes downtimes and incurs expense, since the system is disturbed by refilling. For this reason, a refrigerator is implemented. The refrigerator has a cooling region past which the cryogenic fluid flows. Part of the cooling region is sufficiently cold to liquefy gaseous cryogenic fluid, which then drips into the cryogenic fluid tank.

DE 100 33 410 C1 discloses a cryostat configuration for receiving superconducting magnets, wherein a cryogenic fluid tank terminates in a neck tube of the cryostat, and a refrigerator is disposed in the neck tube. At least one separating body is provided which divides the neck tube into two partial volumes to guide the gaseous cryogenic fluid flow in a cycle.

When the refrigerator fails, a large amount of heat is input into the cryostat through cryogenic fluid convection flows and also through thermal radiation emitted by the refrigerator and/or the walls surrounding it. This heat input evaporates expensive cryogenic fluid. If an excessive amount of coolant is lost, the magnet must even be discharged.

Maintenance or repair of the refrigerator requires opening the refrigerator tower and entails the risk of quenching (i.e. a sudden breakdown of the superconductivity) the cooled magnet with an associated massive heat input into the liquid cryogenic fluid, causing large amounts of cryogenic fluid and/or very cold gas to suddenly escape. This could cause injuries to a maintenance technician or other individuals in the surroundings of the cryostat.

In contrast thereto, it is the object of the present invention to design the cryostat of a superconducting magnet system such that the heat input into the cryostat is reduced when the refrigerator fails, and the safety of the maintenance staff is improved in case of a quench.

SUMMARY OF THE INVENTION

This object is achieved in accordance with the invention by a superconducting magnet system of the above-mentioned type, characterized by a radiation shield which separates a refrigerator space from the cryogenic fluid tank, wherein the complete cooling region of the refrigerator is disposed in the refrigerator space, and wherein the radiation shield has openings for the gas or fluid exchange between refrigerator space and cryogenic fluid tank. Separation of the refrigerator space, and thereby of the refrigerator, from the cryogenic fluid tank produces an insulating effect. The radiation shield largely shields thermal radiation emitted by the refrigerator from the cryogenic fluid tank. The convection between the cryogenic fluid tank and the refrigerator space is determined by the openings in the radiation shield and is minimized compared to prior art. At the same time, the radiation shield forms a protection from splashing cryogenic liquid in case of a quench, wherein the amount of suddenly released very cold gas is also limited by the openings. On the other hand, the openings in the radiation shield provide sufficient fluid exchange in order to ensure sufficient cryostat cooling during normal operation. Gaseous cryogenic fluid flows from the cryogenic fluid tank into the refrigerator space and is cooled on the refrigerator and finally liquefied. The liquefied cryogenic fluid flows or drips through the openings back into the cryogenic fluid tank.

In one preferred embodiment of the inventive superconducting magnet system, the radiation shield has a reflection coefficient of $\epsilon<0.5$, preferably $\epsilon<0.2$ and preferentially $\epsilon<0.05$. In this case, any thermal radiation input via the refrigerator is particularly small.

In one preferred embodiment, the radiation shield consists of polished stainless steel. This material has proven to be particularly advantageous for the radiation shield.

In an alternative embodiment, the radiation shield consists of coated plastic reinforced by fibers (GFK).

In one preferred embodiment of the inventive superconducting magnet system, the radiation shield is thermally coupled to the refrigerator and acts as a recondensation surface for the cryogenic fluid. In this case, the convection flow of cryogenic fluid may be adjusted to a very low value which minimizes the thermal input via convection.

In a further development of this embodiment, thermal coupling is effected through contacting a copper block. The copper block thereby directly contacts both the refrigerator and the radiation shield. The copper block provides a large contact cross-section and therefore good thermal coupling.

In an alternative further development of the above-mentioned embodiment, thermal coupling is effected via a flexible copper strand. This minimizes transfer of vibrations to the radiation shield and therefore into the cryogenic fluid tank.

In one preferred embodiment of the inventive superconducting magnet system, the radiation shield has sufficient mechanical stability to withstand an overpressure of 1 bar during a quench. This increases the safety of people present in the surroundings.

In one particularly advantageous embodiment, the positions of the openings of the radiation shield largely and, in particular completely, limit the radiation angle of the refrigerator. The radiation shield largely prevents refrigerator thermal radiation from directly impinging on the cryogenic fluid tank, or its contents. This minimizes thermal input into the cryogenic fluid tank, should the refrigerator fail.

In a particularly preferred embodiment of the inventive superconducting magnet system, the radiation shield is formed from several superposed shielding layers. This improves insulation of the cryogenic fluid tank from thermal radiation.

In an advantageous further development of this embodiment, the openings of the individual shielding layers are mutually offset. This provides straightforward mutual shadowing of the openings, in particular, from thermal radiation.

In a further preferred embodiment, the openings in the radiation shield have a round or cornered shape. These shapes are easy to produce.

In one preferred embodiment, the largest diameter of the openings in the radiation shield is between 1 and 10 mm, preferably between 1 and 5 mm. These diameters ensure sufficient fluid exchange and at the same time good protection.

In one particularly preferred embodiment, the refrigerator space comprises a neck tube, wherein the openings in the radiation shield extend perpendicularly to the direction of extension of the neck tube. This embodiment combines good splash protection and sufficient possibilities for discharging liquid cryogenic fluid from the radiation shield into the cryogenic fluid tank. The splash protection is particularly suitable, since pressurized cryogenic fluid flows into the neck tube from a transverse direction and has no speed component out of the neck tube in the direction of extension thereof.

Alternatively or additionally, in a preferred embodiment, the refrigerator space comprises a neck tube and the radiation shield has a splash protection surface without openings, whose surface corresponds to the opening of the neck tube facing the cryogenic fluid tank and lies in an imaginary extension of the neck tube. The splash protection surface prevents the cryogenic fluid from splashing directly out of the cryogenic fluid tank into the neck tube in a direction of motion parallel to the direction of extension of the neck tube. This increases the safety during maintenance work in case of a quench.

In a further development of this embodiment, the radiation shield has a shielding surface which extends perpendicularly to the direction of extension of the neck tube and comprises the splash protection surface without openings, wherein the shielding surface has openings which are outside of the imaginary extension of the neck tube. The shielding surface typically delimits the refrigerator space towards the bottom, i.e. towards the cryogenic fluid tank. In this case, the openings ensure good discharge of liquid cryogenic fluid without impairing splash protection.

In one particularly preferred embodiment of the inventive superconducting magnet system, the radiation shield has the shape of a pot. The pot shape has proven to be advantageous in practice and is easy to manufacture.

In an alternative embodiment, the radiation shield has a parabolic shape. This shape has also proven to be advantageous in practice.

An advantageous embodiment is characterized in that a pipe conduit for cryogenic fluid is provided which opens into the refrigerator space. Gaseous cryogenic fluid suctioned from the cryogenic tank can be returned to the cryostat via the pipe conduit. The cryogenic fluid that flows in through the pipe conduit is cooled and liquefied by the refrigerator, and drips back into the cryogenic fluid tank. This reduces the cooling temperature without increasing cryogenic fluid consumption. The pipe conduit in the refrigerator space may have a minimum length. In this case, the incoming, initially gaseous cryogenic fluid should be directed along the cooling region of the refrigerator. Alternatively, the pipe conduit may guide the incoming cryogenic fluid along the cooling region of the refrigerator.

In a preferred further development of this embodiment, the pipe conduit is thermally coupled to the cooling region of the refrigerator, wherein, in particular, the pipe conduit is wound about the refrigerator. This accelerates cooling of the incoming cryogenic fluid.

In one advantageous embodiment, the cryogenic fluid is helium. Helium can be cooled down to particularly low temperatures. Moreover, when expensive helium is used, the reduction in cryogenic fluid consumption during failure of the refrigerator is particularly advantageous.

In one alternative embodiment, the cryogenic fluid is hydrogen, neon or nitrogen.

In one preferred embodiment of the superconducting magnet system, the refrigerator is a pulse tube cooler. Pulse tube coolers have proven to be suitable in practice.

In an alternative embodiment, the refrigerator is a Gifford-McMahon cooler.

One advantageous embodiment is characterized in that the magnet system is a magnetic resonance apparatus.

Further advantages of the invention can be extracted from the description and the drawings. The features mentioned above and below may be used individually or collectively in arbitrary combination. The embodiments shown and described are not to be understood as exhaustive enumeration but have exemplary character for describing the invention.

The invention is explained in more detail in the drawing.

DESCRIPTION OF THE PREFERRED EMBODIMENT

Figure 1:
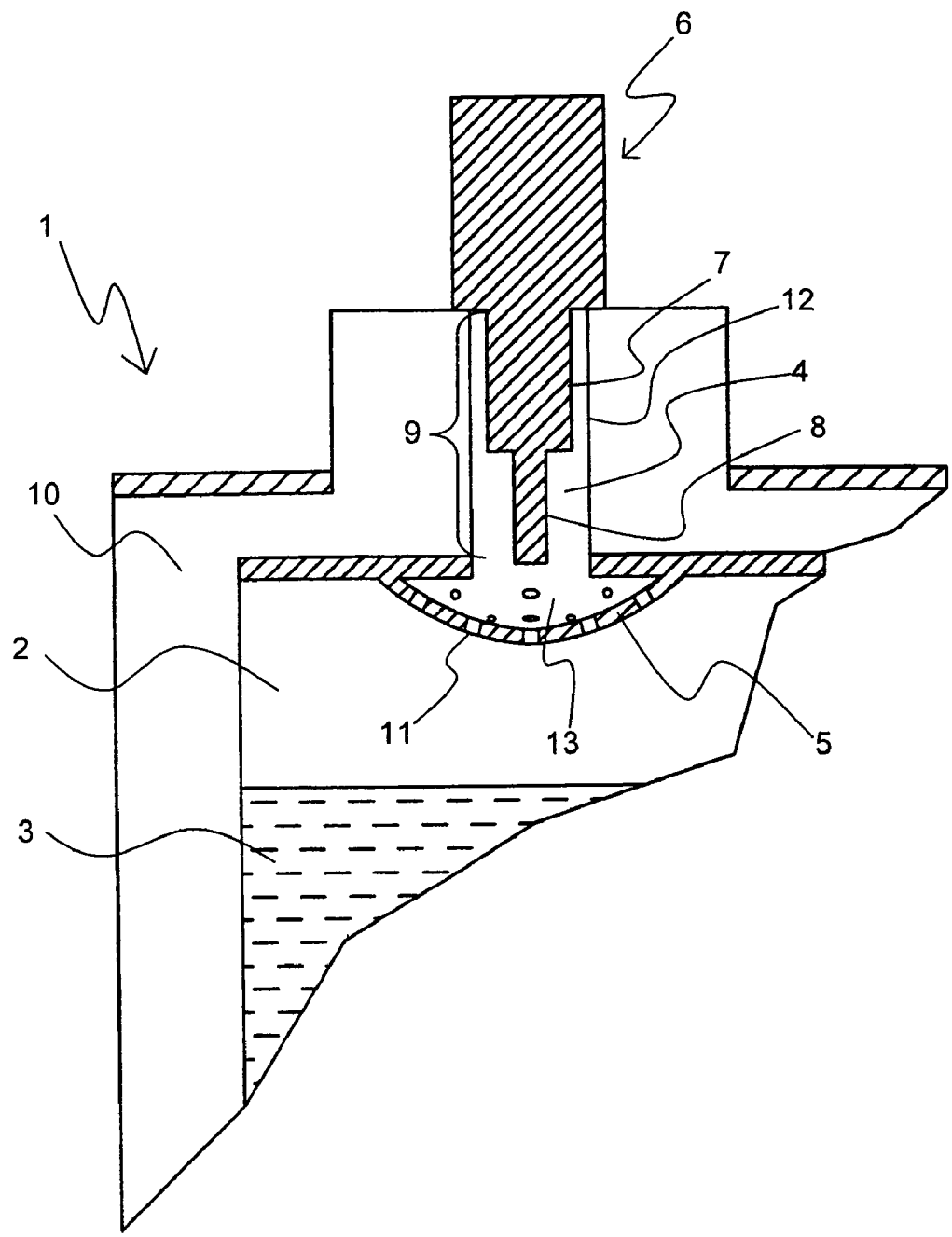
FIG. 1 shows a schematic view of an embodiment of an inventive superconducting magnet system with a parabolic radiation shield.

FIG. 1 shows a first embodiment of an inventive superconducting magnet system. A cryostat 1 comprises a cryogenic fluid tank 2 with stored cryogenic fluid. The cryogenic fluid is partially present in the form of liquid cryogenic fluid 3, and partially fills the remaining cryogenic fluid tank 2 and a refrigerator space 4 in the form of gas. The refrigerator space 4 is separated from the cryogenic fluid tank 2 by a radiation shield 5. The refrigerator space 4 substantially comprises the inside of a neck tube 12 and a space 13 covered by the radiation shield 5. A refrigerator 6 projects into the refrigerator space 4. The refrigerator 6 comprises a first cooling stage 7 and a second, colder cooling stage 8. The two cooling stages, 7, 8 form the cooling region 9 of the refrigerator 6. The cooling region 9 is completely housed in the refrigerator space 4. None of the parts of the cooling region 9 are located within the cryogenic fluid tank 2. The cryostat 1 moreover has an evacuated space 10 which thermally insulates the cryogenic fluid tank 2 and the refrigerator space 4 from the surroundings. A superconducting magnet coil system (not shown) is disposed in the cryogenic fluid tank 2, which is cooled by the liquid cryogenic fluid 3.

The radiation shield 5 has several openings 11 which permit exchange of cryogenic fluid between the cryogenic fluid tank 2 and the refrigerator space 4. Gaseous cryogenic fluid can flow through the openings 11 from the cryogenic fluid tank 2 into the refrigerator space 4, where it is cooled on the cooling region 9 of the refrigerator 6 and liquefied at the lower end of the second cooling stage 8. The liquefied cryogenic fluid forms drops which can flow through the openings 11 into the cryogenic fluid tank 2, thereby producing a cycle.

If the cooling means on the refrigerator 6 fails, heat could enter the cryogenic fluid tank 2. The refrigerator 6 radiates in the infrared region in all spatial directions. The radiation shield 5 thereby largely blocks downward thermal radiation, and thereby thermal input into the cryogenic fluid tank 2 and into the liquid cryogenic fluid 3. Moreover, gaseous cryogenic fluid heated in the vicinity of the refrigerator 6 may enter into the cryogenic fluid tank 2 due to convection. The radiation shield 5 thereby reduces the convection flow to the amount of cryogenic fluid which can flow through the openings 11. Heated cryogenic fluid remains largely in the refrigerator space 4.

In case of a quench, the liquid cryogenic fluid 3 in the cryogenic fluid tank 2 is quickly heated. Large amounts of gaseous cryogenic fluid are produced and when the liquid cryogenic fluid 3 boils, liquid cryogenic fluid 3 may be thrown upwards. The radiation shield 5 covers the lower access to the neck tube 12 to largely prevent penetration of liquid cryogenic fluid 3 into the neck tube 12. The radiation shield 5 also reduces the amount of very cold gaseous cryogenic fluid that surges into the neck tube 12. This substantially protects a service technician, who is working on the open refrigerator space, from the cryogenic fluid.

Figure 2:
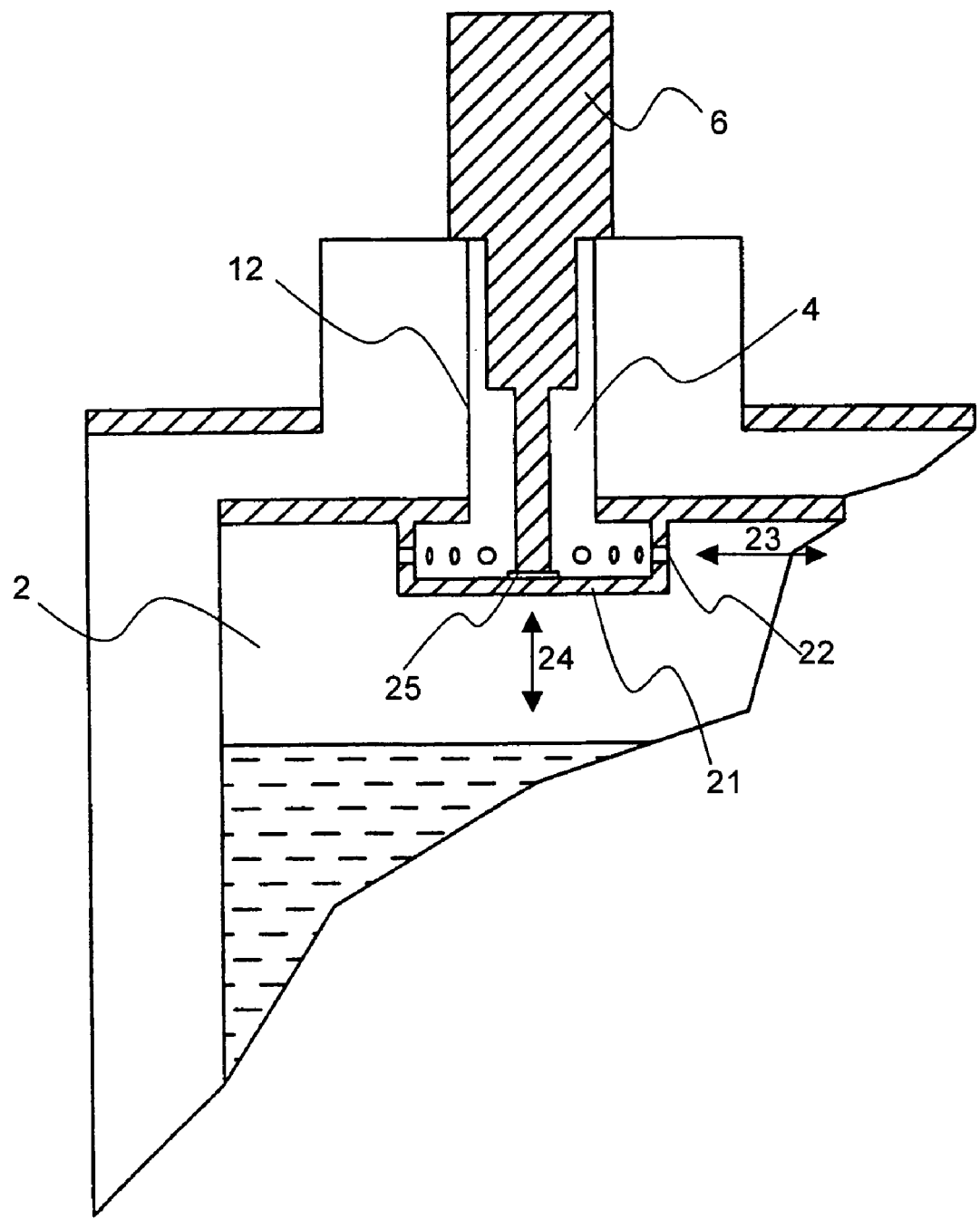
FIG. 2 shows an embodiment of an inventive superconducting magnet system with a pot-shaped radiation shield which is thermally coupled to the refrigerator.

FIG. 2 shows a further similar embodiment of an inventive magnet system. A pot-shaped radiation shield 21 is disposed between the refrigerator space 4 and the cryogenic fluid tank 2. It has lateral openings 22. The openings 22 penetrate through the wall of the radiation shield 21 in a horizontal direction, i.e. they extend in a horizontal direction. The opening 22 on the far right extends e.g. in the direction 23. In contrast thereto, the approximately hollow-cylindrical neck tube 12 extends in a vertical axial direction, i.e. in the direction 24. The direction of extension of the openings 22 and the direction of extension 24 of the neck tube 12 are therefore at right angles to each other. This prevents upwardly moving cryogenic fluid from entering into the neck tube 12.

The lower end of the refrigerator 6 is connected to the bottom of the radiation shield 21 via a copper block 25. The radiation shield 21 therefore assumes very low temperatures and can be used as a condensation surface for cryogenic fluid.

Figure 3:
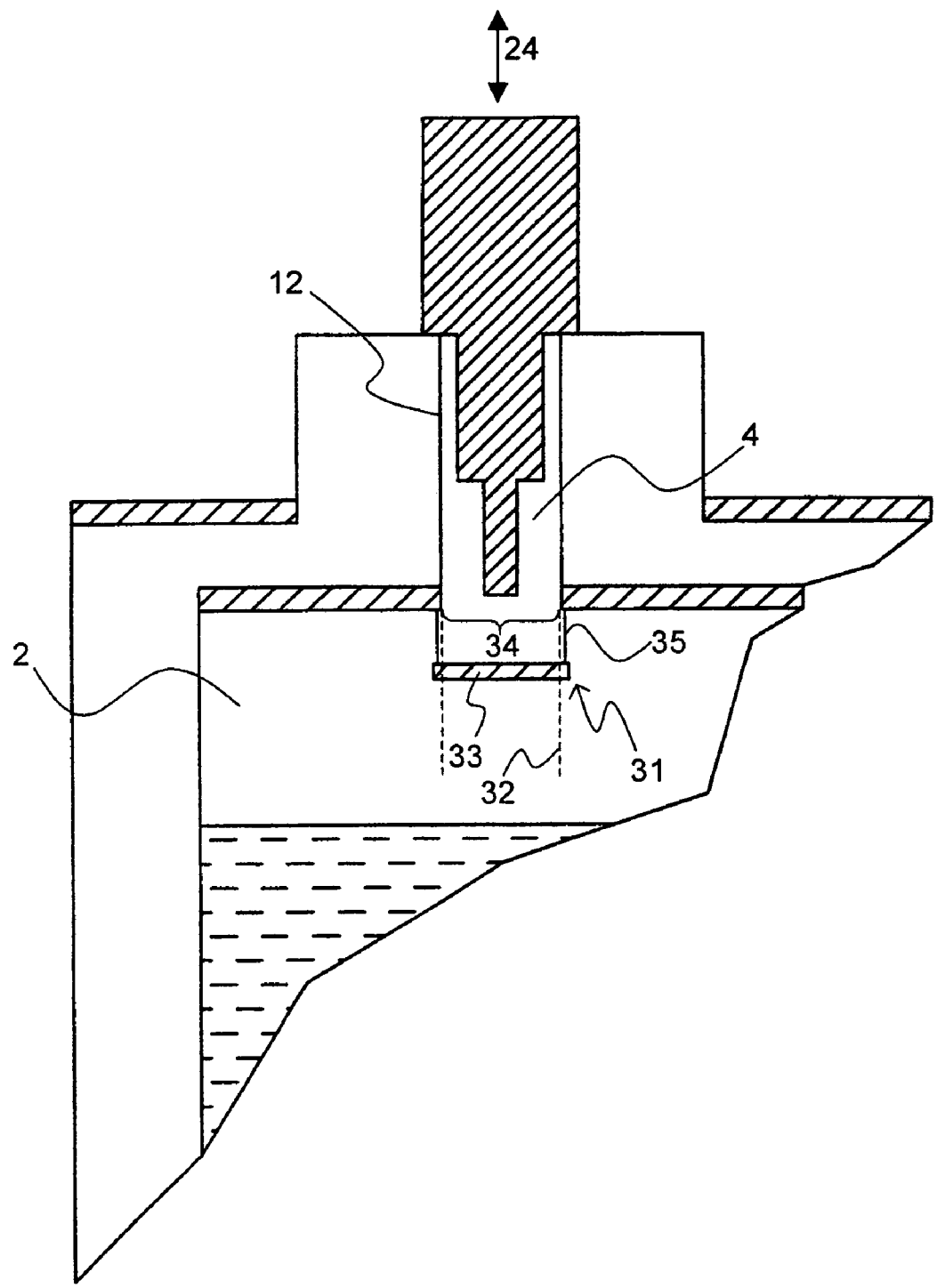
FIG. 3 shows an embodiment of an inventive superconducting magnet system with a radiation shield comprising a splash protection surface which is mounted with two pins.

FIG. 3 shows a particularly simple embodiment of the inventive superconducting magnet system. A radiation shield 31 separates the refrigerator space 4 from the cryogenic fluid tank 2. A splash protection surface 33 without openings is disposed in imaginary extension 32 of the neck tube 12 towards the cryogenic fluid tank 2. It is mounted in the cryostat via two pins 35. The space between the pins 35 defines two openings.

The splash protection surface 33 without openings has a surface which corresponds to the surface of the opening 34 of the neck tube 12 facing the cryogenic fluid tank 2. The radiation shield 31 is, however, slightly wider than the splash protection surface 33 without openings, i.e. the radiation shield 31 is wider than required by the width of the opening 34 of the neck tube 12. The splash protection surface 33 without openings prevents cryogenic fluid from passing into the neck tube 12 in a direction of motion parallel to the direction of extension 24 of the neck tube 12, in case of a quench. Due to the widening of the radiation shield 31 compared to the width of the opening 34 of the neck tube 12, the splash protection also covers cryogenic fluid that does not move parallel to the direction of extension 24 of the neck tube 12.

Figure 4:
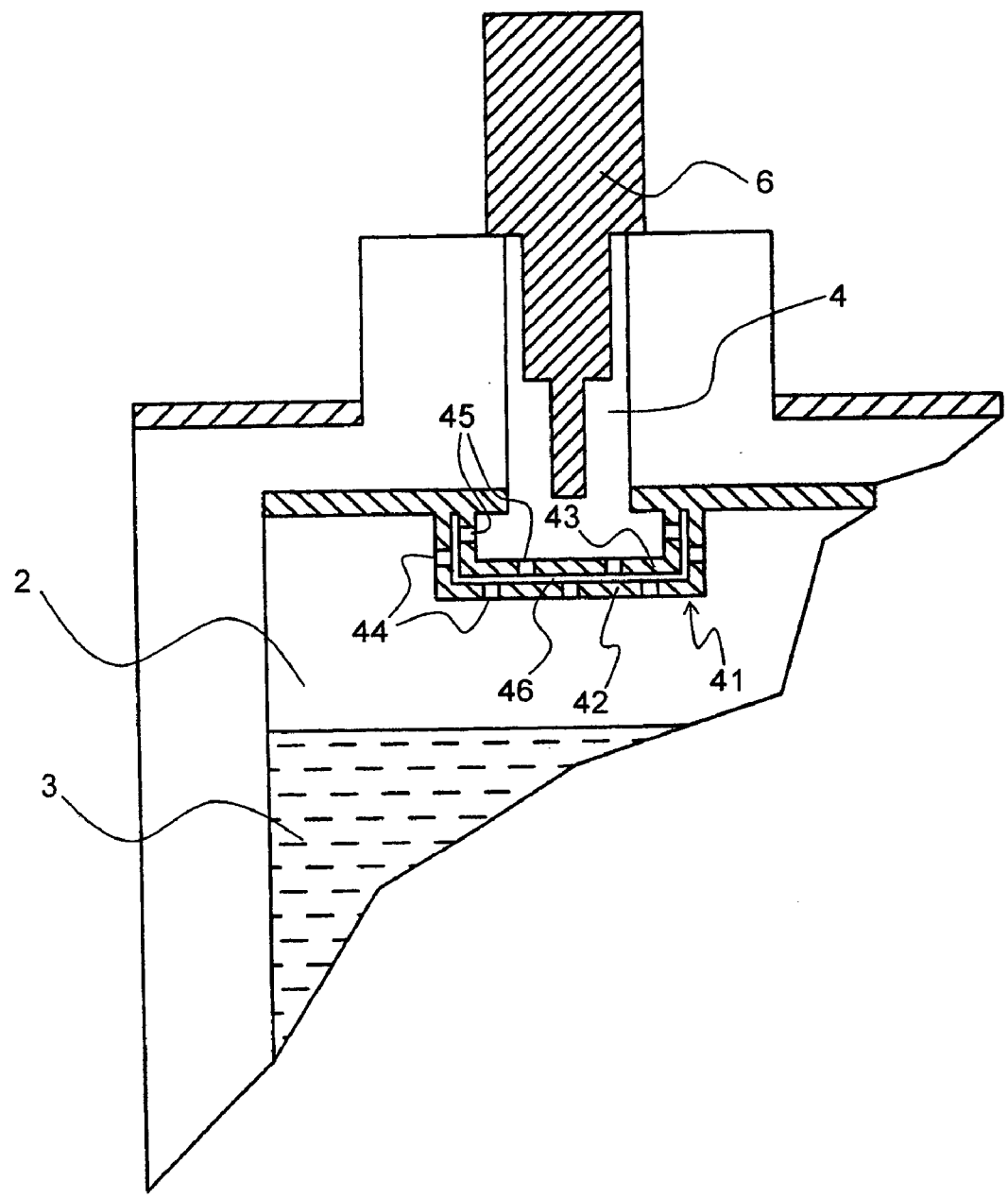
FIG. 4 shows an embodiment of an inventive superconducting magnet system with a radiation shield which comprises two shielding layers with mutually offset openings.

FIG. 4 shows an embodiment of an inventive superconducting magnet system, wherein a radiation shield 41 is formed from two shielding layers 42 and 43. The shielding layer 43 is disposed at a separation above the shielding layer 42. The shielding layers 42, 43 are nested. The lower shielding layer 42 has openings 44 on its lower side and on its side. The upper shielding layer 43 also has openings 45. The openings 44, 45 are each disposed opposite to sections of the respectively other shielding layer 43, 42 without openings, so that no liquid cryogenic fluid 3 can splash along a straight path into the refrigerator space 4. Due to the mutually offset arrangement of the openings 44, 45 of the two shielding layers 42, 43, the cryogenic fluid can pass from the cryogenic fluid tank 2 into the refrigerator space 4 or vice versa only by changing its direction, in particular, through a gap 46 between the shielding layers 42, 43. The direct path between refrigerator 6 and cryogenic fluid tank 2 is also blocked for thermal radiation.

Figure 5:
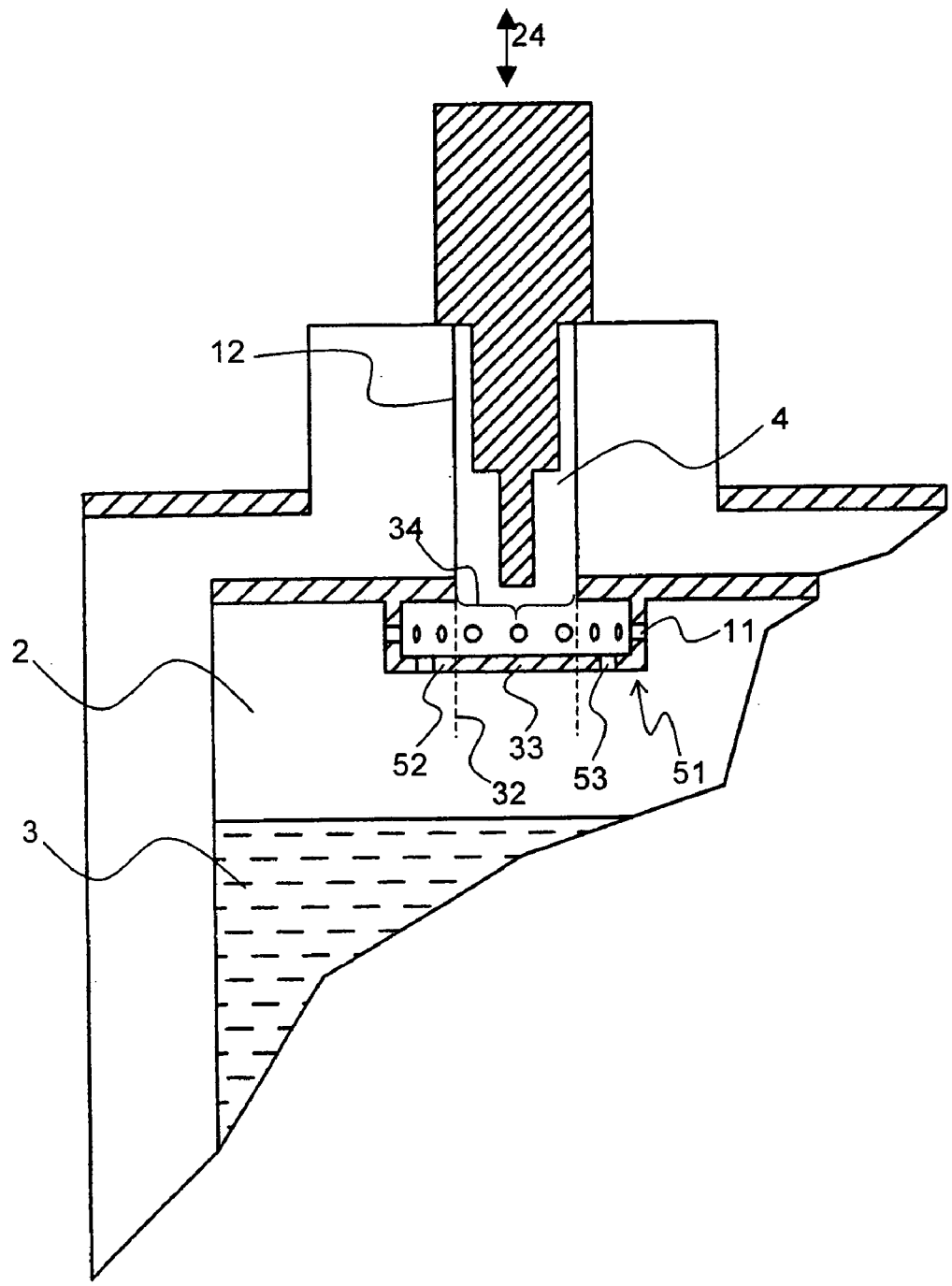
FIG. 5 shows an embodiment of an inventive superconducting magnet system with a radiation shield whose lower side has openings which are disposed outside of an imaginary extension of the neck tube.

FIG. 5 shows an embodiment of the inventive superconducting magnet system comprising a pot-shaped radiation shield 51. This radiation shield 51 has a lower shielding surface 52 which is perpendicular to the direction of extension 24 of the neck tube 12. In its central region, the shielding surface 52 has a splash protection surface 33 without openings, whose width and surface correspond to the openings 34 of the neck tube 12 and lies in imaginary extension 32 of the neck tube 12 in the direction towards the cryogenic fluid tank 2. The outer region of the shielding surface 52, i.e. the region outside of the imaginary extension 32, has openings 53 which permit discharge of liquefied cryogenic fluid from the pot-shaped radiation shield 51 into the cryogenic fluid tank 2. Due to the position of the openings 11, 53 in the radiation shield 5, the thermal radiation cannot directly pass from the refrigerator 6 to the liquid cryogenic fluid 3 and liquid cryogenic fluid 3 cannot splash up to very high levels in the neck tube 12.

Figure 6:
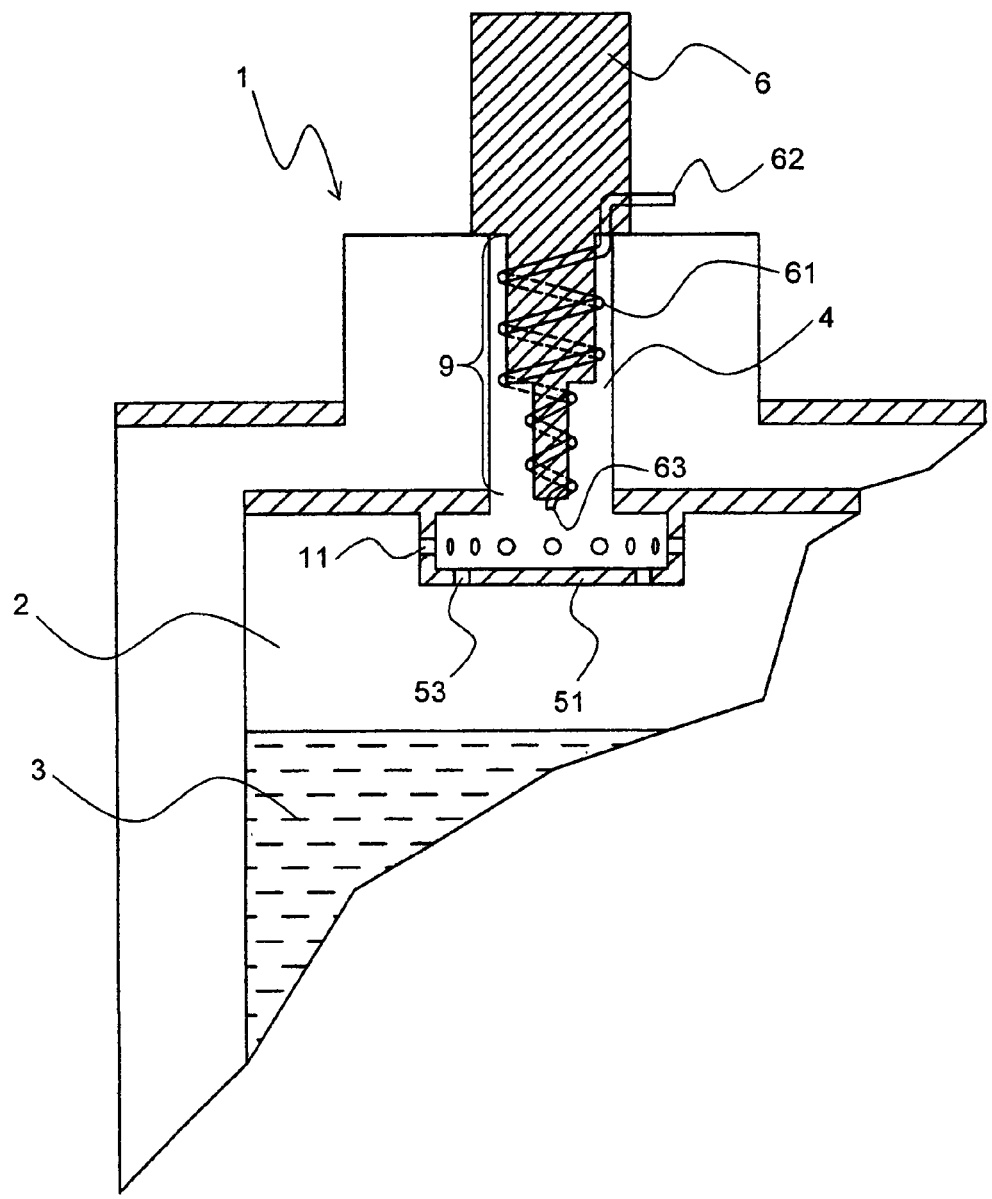
FIG. 6 shows an embodiment of an inventive superconducting magnet system with a cryogenic fluid pipe conduit which terminates in a refrigerator space.

FIG. 6 shows an embodiment of the inventive superconducting magnet system which largely corresponds to the embodiment of FIG. 5, and comprises a pipe conduit 61 which terminates in the refrigerator space 4.

In order to reduce the boiling point of liquid cryogenic fluid 3 in the cryogenic fluid tank 2 and thereby to the lowest possible temperature for the magnet system, gaseous cryogenic fluid is constantly suctioned from the cryogenic fluid tank 2 (not shown). The suctioned cryogenic fluid is returned to the cryostat 1 via the pipe conduit 61.

The gaseous cryogenic fluid is introduced into the pipe conduit 61 through an inlet 62 which is disposed in the outer space of the cryostat 1. The pipe conduit 61 helically winds about the cooling region 9 of the refrigerator, 6 to cool the cryogenic fluid flowing in the pipe conduit 61. The cryogenic fluid is cooled in the region of an outlet 63 of the pipe conduit 61 until it is in the liquid state. The outlet 63 is in the region of the lower, coldest end of the refrigerator 6, above the radiation shield 51. Liquid cryogenic fluid therefore drips from the outlet 63 onto the radiation shield 51, and then passes through the openings 53 on the lower side of the radiation shield 51 into the cryogenic fluid tank 2.

In this embodiment, the convection of gaseous cryogenic fluid between cryogenic fluid tank 2 and refrigerator space 4 is of subordinate importance for cooling the cryogenic fluid. The openings 11, 53 in the radiation shield 51 must merely permit dripping of liquid cryogenic fluid.

In summary, the invention concerns a cryostat for a superconducting magnet coil system which can be disposed in a cryogenic fluid tank of the cryostat. The cryostat comprises a radiation shield which is disposed between the cryogenic fluid tank and a refrigerator space. The refrigerator space accommodates the cold stages of a refrigerator. The radiation shield has openings for passage of the cryogenic fluid in order to cool the cryogenic fluid in the cryogenic fluid tank. The radiation shield impairs any convection flows exceeding the cooling function, which are generated, in particular, should the refrigerator fail. Thermal radiation from the refrigerator is shadowed by the radiation shield relative to the cryogenic fluid tank. The radiation shield moreover also acts as splash protection for liquid cryogen, in particular, in case of a quench.

We claim:

1. A superconducting magnet system comprising:
   an outer cryostat container having an outer cryostat upper surface;
   a cryogenic fluid tank for a cryogenic fluid, said cryogenic fluid tank disposed within said outer cryostat container, said cryogenic fluid tank having a flat, horizontally extending cryogenic tank upper surface and substantially vertical side walls extending downwardly from said cryogenic tank upper surface, said flat, horizontally extending cryogenic tank upper surface having an upper surface opening;
   a neck tube, said neck tube extending in a downward direction from said outer cryostat upper surface towards said cryogenic fluid tank, said neck tube having a diameter that is substantially smaller than an extent of said cryogenic tank upper surface in said horizontal direction, said neck tube further having a substantially horizontal lower opening coinciding with said upper surface opening of said cryogenic fluid tank, said lower opening having a first width;
   a superconducting magnet coil system disposed in said cryogenic fluid tank;
   a refrigerator to cool the cryogenic fluid, said refrigerator extending downwardly within said neck tube towards said cryogenic fluid tank, said refrigerator having an entire cooling region disposed in a refrigerator space; and
   a radiation shield disposed to separate said refrigerator space from said cryogenic fluid tank, said radiation shield having openings for gas or fluid exchange between said refrigerator space and said cryogenic fluid tank, said radiation shield comprising a substantially horizontal splash protection plate without openings, said splash protection plate disposed within said cryogenic fluid tank, below and separated from both said lower opening of said neck tube and said upper surface opening of said cryogenic fluid tank, said splash protection plate having a second width which exceeds said first width of said neck tube lower opening, wherein said splash protection plate is disposed, structured and dimensioned such that positions of openings in said radiation shield prevent refrigerator thermal radiation from directly impinging on the cryogenic tank or its contents.

2. The superconducting magnet system of claim 1, wherein said radiation shield comprises polished stainless steel.

3. The superconducting magnet system of claim 1, wherein said radiation shield has sufficient mechanical stability to withstand an overpressure of 1 bar in response to a quench.

4. The superconducting magnet system of claim 1, wherein said openings in said radiation shield are positioned to largely or completely limit a radiation angle of said refrigerator.

5. The superconducting magnet system of claim 1, wherein the cryogenic fluid is helium.

6. The superconducting magnet system of claim 1, wherein the cryogenic fluid is hydrogen, neon or nitrogen.

7. The superconducting magnet system of claim 1, wherein said refrigerator is a pulse tube cooler.

8. The superconducting magnet system of claim 1, wherein the magnet system is a magnetic, resonance apparatus.

* * * * *

UNITED STATES PATENT AND TRADEMARK OFFICE
CERTIFICATE OF CORRECTION

Page 1 of 1

PATENT NO. : 8,316,651 B2
APPLICATION NO. : 11/488776
DATED : November 27, 2012
INVENTOR(S) : Klaus Schlenga et al.

It is certified that error appears in the above-identified patent and that said Letters Patent is hereby corrected as shown below:

Title page, item 56 Reference Cited should read as shown below

US PATENT DOCUMENTS

| | | | |
|---|---|---|---|
| 5,586,437 A | 12/1996 | Blecher | |
| 6,389,821 B2 | 5/2002 | Strobel | |
| 6,804,968 B2 | 10/2004 | Strobel | |
| 7,395,671 B2* | 7/2008 | Miki | ..........62/51.1 |
| 2008/0092557 A1* | 4/2008 | Mraz et al. | ..........62/51.1 |

FOREIGN PATENT DOCUMENTS

| | | | |
|---|---|---|---|
| JP | 62 277 707 | 12/1987 | |
| JP | 631 17 409 | 5/1988 | |

Signed and Sealed this
Twenty-sixth Day of February, 2013

Teresa Stanek Rea
*Acting Director of the United States Patent and Trademark Office*